United States Patent [19]

Menzi et al.

[11] 3,867,560

[45] Feb. 18, 1975

[54] GELLED PROTEIN PROCESS FOR THE PRODUCTION OF A GELLED PROTEIN FOODSTUFF

[75] Inventors: Robert Menzi, Geneve; Hartmut Zeller, Grand-Lancy/Geneve, both of Switzerland

[73] Assignee: Vivil A. Muller & Co., Offenburg, Germany

[22] Filed: May 2, 1972

[21] Appl. No.: 249,494

[30] Foreign Application Priority Data
May 6, 1971 Switzerland............................ 6736/71
Mar. 23, 1972 Switzerland........................... 4313/72

[52] U.S. Cl................... 426/350, 426/167, 426/201, 426/213, 426/218, 426/804
[51] Int. Cl................................................ A23l 1/04
[58] Field of Search.................. 99/134, 131, 86, 1; 426/167, 168, 213, 350, 359, 364, 804

[56] References Cited
UNITED STATES PATENTS
3,058,828   10/1962   Lindblad.............................. 99/1 X
3,097,946   7/1963   Menzi....................................... 99/1

*Primary Examiner*—Samih N. Zaharna
*Assistant Examiner*—J. M. Hunter
*Attorney, Agent, or Firm*—Eric H. Waters

[57] ABSTRACT

Foodstuff of the confectionery type, but containing considerably less assimilable carbohydrates, and process for the production thereof from a homogeneous paste of a mixture of carbohydrates such as monosaccharides in a proportion of between 35 and 60% by weight, proteins soluble or dispersible in an aqueous medium of a pH between 6.2 and 7.2, in a proportion of between 1 and 45%, a gelling protein or carbohydrate containing at least 70% of non-assimilable material, in a proportion of between 12 and 20%, and between 4 and 25% of water.

9 Claims, No Drawings

GELLED PROTEIN PROCESS FOR THE PRODUCTION OF A GELLED PROTEIN FOODSTUFF

It is an object of the present invention to provide a dietetic confectionery article having a low content of assimilable carbohydrates and nevertheless the same consistency and capacity of preservation as those of the conventional confectioneries.

To achieve this object, the invention provides a foodstuff comprising an aqueous homogeneous paste prepared from a mixture containing at least one assimilable carbohydrate selected from the group consisting of monosaccharides and oligosaccharides in a proportion of from 35 to 60% by weight; at least one assimilable protein material soluble or dispersible in an aqueous medium of a pH between 6.2 and 7.2; in a proportion of between 1 and 45 % by weight; at least one gelling agent selected from the group consisting of gelling proteins and gelling carbohydrates, said agent containing at least 70% by weight of non-assimilable material; and between 4 and 24% by weight of water; the entire amount of gelling agent in the entire quantity of the mixture being between 12 and 20 % by weight.

According to a modification of this foodstuff the mixture can also contain at least one powdery vegetable cellulose material in an amount such that the total amount of gelling agent and powdery vegetable cellulose material constitutes between 12 and 40 % by weight of the total weight of the mixture.

The foodstuff can also contain various other materials, particularly an amount of fats of up to 5 % by weight of the total weight of the mixture, at least one additive for improving the preservative properties and/or for retaining humidity (moisture), and at least one mineral salt, particularly sodium chloride.

The invention also relates to a process for the production of the foodstuff described above. This process is characterized in that, among other things, at least one additive is added to the mixture to improve the preservative properties and/or the moisture retaining capacity thereof.

In this manner it is possible to considerably reduce the percentage by weight of sugar contained in the foodstuff without using artificial sweeteners and to produce a foodstuff having the same consistency as the conventional confectioneries containing a large proportion of sugar by using the gelling agents indicated above in the percentages specified. By dosing the quantities as indicated above, particularly with respect to the ratio between the content of water and that of sugar, an appropriate balance is obtained between the consistency and the preservative properties of the product.

The assimilable carbohydrates used can be, for example, a sugar, particularly saccharose, glucose, fructose, etc, However, preferably fructose is used since it has a particularly high sweetening power, higher than that of saccharose and glucose, and can easily be dissolved in water. Moreover, the fructose imparts an excellent consistency to the product.

The assimilable carbohydrate can be introduced into the mixture in a pure state, if desired, in the form of an aqueous solution, or in combination with other materials, for example, in the form of molasses or syrup.

The assimilable protein material used can be, for example, cow's skim milk powder, a dry extract of yogurt, acid casein, sodium caseinate, soya-meal and the like. Preferably, degreased roasted soya-meal or soya-semolina is used, since this material is most suitable both from the point of view of organoleptic properties and of preservative capability.

As a gelling carbohydrate, for example, a polysaccharide or a polysaccharide derivative, particularly carobine (carob-seed gum), pectins, guar gum, agar-agar, arabic gum, gum tragacanth, carrageenan and their salts can be used. Of these materials, carobine is preferred for use since it contains at least 80% of non-assimilable substances and has the property of increasing in volume in the stomach. Thus, it is most suitable for slimming diets.

As a gelling protein material, for example, gelatin, gluten or the like can be used.

In addition to the materials described above, which play an essential part in the composition of the mixture, the latter can contain fats, preferably in an amount of not more than 5% by weight; complex materials such as cocoa; and materials designed to play various secondary roles.

Thus, the mixture can contain a material designed to check the propagation of microbes, for example, sorbic acid or potassium sorbate. The mixture can also contain at least one edible acid, for example, citric acid or lactic acid, to reduce its pH for the purpose of improving the preservative capability of the product, at least one substance having a great affinity to water, for example, glycerin or sorbitol, designed to maintain the moisture content of the product constant, and finally sodium chloride, flavours and food dyes.

According to a modification of the process a portion of the assimilable protein material corresponding to at least 1% by weight of the total weight of the mixture is in a form capable of foaming in the presence of water and further at least one powdery vegetable cellulose material is added to the mixture in an amount such that the total amount of the gelling agent and the powdery vegetable cellulose material will be between 12 and 40 % by weight of the total weight of the mixture.

According to this modification the paste is preferably formed in the following manner:

All the protein materials and the assimilable carbohydrates are mixed with the amount of water used in the liquid state and the solution or dispersion thus obtained is stirred during or after the mixing operation so as to form a foam, then the gelling agent is mixed with this foam, and finally the powdery vegetable cellulose material is mixed with the latter mixture thus obtained.

When no protein material capable of foaming in the presence of water is used, the mixture is preferably heated to a temperature between 85° and 100° C. for at least 10 minutes and then the mixture is cooled down to ambient temperature.

Generally, the ingredients of the mixture are preferably kept at a temperature in the range between 10° and 130° C. during the preparation of the paste.

The assimilable protein material capable of foaming in the presence of water can be, for example, a mixture containing about 80 % by weight of assimilable protein, 5 % of mineral ashes, 5 % of water and 10 % of saccharose.

The powdery vegetable cellulose material used can be, for example, fruit marc, particularly apple marc, pear marc, grape marc, coffee-grounds, etc., citrus fruit peels and generally all products of vegetable origin formed of cellulose compounds such as cellulose, hemicellulose, etc. Preferably, this cellulose material is used after removing therefrom the assimilable materials such as sugars, fats, etc., or other noncellulose materials which generally accompany the natural product used as the source for the cellulose material, for example, the pressed fruit pulp remaining after pressing fruit for the purpose of extracting the juice. All the same, if desired, the fruit marc or pulp can be used as it, or only partially purified fruit marc can be used by taking into account the amount of assimilable material contained therein when determining the overall composition of the mixture.

Preferably, the vegetable cellulose material is used in the form of a powder having a grain size of less than 100 microns, the best grain size being in the order of 20 to 80 microns. It is not necessary that the powder should be completely dry before it is added to the mixture. Rather, it will be sufficient to allow for the small amount of water contained therein when calculating the total amount of water introduced into the mixture.

If desired, assimilable materials or other noncellulose materials can be removed from the vegetable cellulose material by any appropriate conventional method, for example, by extraction of the water or by means of one or more suitable organic solvents.

In particular, extraction by water vapour at a pressure slightly above atmospheric has proved to be very well suited for apple marc, the remaining residue having properties which make it particularly well suited for use in producing the foodstuff according to the present invention.

The process described above can also be used for producing confectioneries containing various other edible materials in addition to the composition of the mixture indicated above. For example, grains of at least one puffed cereal (expanded by sudden heating) such as puffed grains of maize, oats, wheat, rice, millet, etc. can be incorporated into the paste. In this manner a particularly light product is obtained which for a given volume has a small caloric value.

The foodstuff described above can be used in the form of confectioneries produced by extrusion, or by simply cutting out the paste and forming it into bodies of the desired dimensions and shapes such as sticks, small cylinders, balls, etc., which, if desired, can be coated by an appropriate cream or garnishing material such as chocolate, almond cream, jam, jelly, etc.

Some examples for carrying out the process of the present invention for the production of the foodstuff as outlined above will now be described in detail.

EXAMPLE 1

A homogeneous paste of a mixture of the following materials is prepared with the following composition in weight percent:

|  | (%) |
|---|---|
| Fructose | 18 |
| Glucose syrup | 9 |
| Degreased and roasted soya-semolina | 22 |
| Non-degreased soya-meal | 5.5 |
| Carob meal | 10 |
| Arabic gum | 2.0 |
| Gelatin | 5.0 |
| Potassium sorbate | 0.7 |
| Sodium chloride | 0.3 |
| Glycerin | 5.0 |

-Continued

|  | (%) |
|---|---|
| Vegetable fat | 2.0 |
| Citric acid | 2.5 |
| Water | 18 |

The degreased and roasted soya-semolina and the non-degreased soya-meal have the following composition:

Degreased and roasted soya-semolina:

(composition in weight percent)

|  | (%) |
|---|---|
| Humidity | 5 – 8 |
| Proteins (N × 6.25) | 52.0 |
| Fat (ether extract) | 1.0 |
| Raw fibres (maximum) | 3.0 |
| Lecithin (phosphatides) | 2.2 |

Non-degreased soya-meal:

(composition in weight percent)

|  | (%) |
|---|---|
| Humidity | 3 – 5 |
| Proteins | 43 |
| Fat (ether extract) | 22 – 23 |
| Raw fibres (maximum) | 2.5 |
| Lecithin (phosphatides) | 2.4 |

The glucose syrup has the following composition in weight percent:

|  | (%) |
|---|---|
| Glucose | 83.2 |
| Water | 16.2 |
| Mineral salts | 0.6 |

The vegetable fat has a Wiley melting point of 22° C. ± 2° C. and a solid fat index corresponding to the following percentages by weight at the following temperatures:

| (%) | (°C.) |
|---|---|
| 25 – 31 | 10 |
| 7 – 13 | 15.5 |
| 3 | 21 |
| 0.5 | 26.5 |

The gelatin used has the following composition in weight percent:

|  | (%) |  | (%) |
|---|---|---|---|
| Proteins | 85.6 | Isoleucine | 1.75 |
| Humidity | 13.0 | Leucine | 3.25 |
| Alanine | 10.2 | Lysine | 4.55 |
| Arginine | 8.7 | Methionine | 0.85 |
| Aspartic acid | 6.8 | Phenylalanine | 2.35 |
| Cystine | 0 | Proline | 15.55 |
| Glycine | 27.2 | Serine | 3.7 |
| Glutamic acid | 11.3 | Threonine | 2.2 |
| Histidine | 0.76 | Thryptophane | 0 |
| Hydroxylysine | 1.15 | Tyrosine | 0.6 |
| Hydroxyproline | 14.3 | Valine | 3.0 |

The paste is prepared and formed into sticks in the following manner:

The fructose, glucose syrup, degreased and roasted soya-semolina, non-degreased soya-meal, carob meal, potassium sorbate and sodium chloride are intimately mixed at ambient temperature to form a homogeneous paste thereof. Then the fat in the molten state and the glycerin are added to this paste and mixed together to form a homogeneous paste which is then heated to 90° C. for 15 minutes while stirring vigorously and adding the water, arabic gum and gelatin. The fluid paste thus obtained is then allowed to cool to 60° C. and extruded at 50° C. in the form of a parallelepipedic stick of square cross section and a side width of 12 mm and this stick is cut into lengths of 10 cm.

The confectionery article thus produced has the following properties:

| | | |
|---|---|---|
| Caloric content | 260 calories/100 g | |
| Total content of assimilable proteins | 14.40% | by weight |
| Total content of assimilable carbohydrates | 39.51 | do. |
| Total content of fats | 3.35% | do. |
| Total content of water | 22.59% | do. |
| Total content of non-assimilable materials | 8.77% | do. |
| Total content of mineral salts | 5.00% | do. |

These confectionery articles keep very well at ambient temperature in the open air. After several months of storing without any particular precautionary measures they still show practically no signs of deterioration. Due to their relatively low content of assimilable carbohydrates they can be consumed in small doses by diabetics without any harm.

EXAMPLE 2

The process as described in Example 1 is repeated but with a paste having the following composition in weight percent:

| | (%) |
|---|---|
| Fructose | 42.5 |
| Degreased and roasted soya-semolina | 10.0 |
| Non-degreased soya-meal | 3.6 |
| Carob meal | 10.0 |
| Gelatin | 7.0 |
| Glycerin | 5.0 |
| Vegetable fat | 1.5 |
| Citric acid | 2.2 |
| Potassium sorbate | 0.4 |
| Sodium chloride | 0.3 |
| Water | 17.5 |

The obtained confectionery article is similar to that produced according to Example 1 and has a caloric content of 276.7 calories per 100 g. Its overall composition in weight percent is as follows:

| | (%) |
|---|---|
| Assimilable proteins | 7.3 |
| Assimilable carbohydrates | 51.8 |
| Fats | 2.3 |
| Non-assimilable materials | 8.35 |
| Mineral salts | 3.07 |
| Water | 19.9 |

EXAMPLE 3

The process as described in Example 1 is repeated but with a paste having the following composition in weight percent:

| | (%) |
|---|---|
| Fructose | 43.9 |
| Degreased, roasted and ground soya-semolina | 19.5 |
| Non-degreased soya-meal | 5.9 |
| Carob meal | 11.7 |
| Gelatin | 3.9 |
| Glycerin | 5.9 |
| Vegetable fat | 1.4 |
| Citric acid | 2.2 |
| Potassium sorbate | 0.3 |
| Sodium chloride | 0.3 |
| Water | 5.0 |

The obtained confectionery article is similar to that produced according to Example 1 and has a caloric content of 318.9 calories per 100 g. Its overall composition in weight percent is as follows:

| | (%) |
|---|---|
| Assimilable proteins | 13.33 |
| Assimilable carbohydrates | 58.06 |
| Fats | 2.80 |
| Non-assimilable materials | 10.23 |
| Mineral salts | 4.11 |
| Water | 8.07 |

EXAMPLE 4

The process as described in Example 1 is repeated but with a paste having the following composition in weight percent:

| | (%) |
|---|---|
| Fructose | 38.5 |
| Non-ground degreased and roasted soya-semolina | 18.5 |
| Ground degreased and roasted soya-semolina | 10.5 |
| Non-degreased roasted soya-meal | 5.2 |
| Carob meal | 10.3 |
| Gelatin | 3.4 |
| Glycerin | 5.1 |
| Vegetable fat | 1.3 |
| Citric acid | 1.9 |
| Potassium sorbate | 0.3 |
| Sodium chloride | 0.2 |
| Water | 4.8 |

The obtained confectionery article is similar to that produced according to Example 1 and has a caloric content of 322.5 calories per 100 g. Its overall composition in weight percent is as follows:

| | (%) |
|---|---|
| Assimilable proteins | 17.85 |
| Assimilable carbohydrates | 54.97 |
| Fats | 2.66 |
| Non-assimilable materials | 9.44 |
| Mineral salts | 4.14 |
| Water | 8.13 |

EXAMPLE 5

The process as described in Example 1 is repeated but with a paste having the following composition in weight percent:

| | (%) |
|---|---|
| Fructose | 35 |
| Non-ground degreased and roasted soya-semolina | 20 |
| Ground degreased and roasted soya-semolina | 13 |
| Carob meal | 15.7 |
| Gelatin | 3 |
| Glycerin | 5 |
| Vegetable fat | 1.3 |
| Citric acid | 2 |
| Potassium sorbate | 0.3 |
| Sodium chloride | 0.2 |
| Water | 4.5 |

The obtained confectionery article is similar to that produced according to Example 1 and has a caloric content of 298.2 calories per 100 g. Its overall composition in weight percent is as follows:

| | (%) |
|---|---|
| Assimilable proteins | 18 |
| Assimilable carbohydrates | 51.4 |
| Fats | 1.65 |
| Non-assimilable materials | 13.76 |
| Mineral salts | 4.39 |
| Water | 8.41 |

EXAMPLE 6

The process as described in Example 1 is repeated but with a paste having the following composition in weight percent:

| | (%) |
|---|---|
| Fructose | 23 |
| Dry extract of yogurt | 14 |
| Non-ground degreased and roasted soya-semolina | 11 |
| Ground degreased and roasted soya-semolina | 17 |
| Carob meal | 12.7 |
| Gelatin | 4.0 |
| Glycerin | 5.0 |
| Vegetable fat | 1.0 |
| Sodium chloride | 0.3 |
| Potassium sorbate | 0.5 |
| Water | 11.5 |

The dry extract of yogurt used has the following composition in weight percent:

| | (%) |
|---|---|
| Proteins | 36 |
| Carbohydrates | 40 |
| Fats | 0.7 |
| Mineral salts | 8.0 |
| Mineral salts of lactic acid | 9.5 |
| Water | 5.0 |

Its caloric content was 344 calories per 100 g.

The obtained confectionery article is similar to that produced according to Example 1 and has a caloric content of 281.6 calories per 100 g. Its overall composition in weight percent is as follows:

| | (%) |
|---|---|
| Assimilable proteins | 20.24 |
| Assimilable carbohydrates | 43.20 |
| Fats | 1.40 |
| Non-assimilable materials | 11.20 |
| Mineral salts | 4.35 |
| Water | 15.40 |

EXAMPLE 7

The process as described in Example 1 is repeated but with a paste having the following composition in weight percent:

| | (%) |
|---|---|
| Fructose | 26.6 |
| Ground roasted and degreased soya-semolia | 37.0 |
| Carob meal | 11.5 |
| Gelatin | 2.5 |
| Glycerin | 4.5 |
| Vegetable fat | 0.5 |
| Sodium chloride | 0.3 |
| Citric acid | 2.8 |
| Potassium sorbate | 0.3 |
| Water | 14.0 |

The obtained confectionery article is similar to that produced according to Example 1 and has a caloric content of 269 calories per 100 g. Its overall composition in weight percent is as follows:

| | (%) |
|---|---|
| Assimilable proteins | 19.3 |
| Assimilable carbohydrates | 43.8 |
| Fats | 0.87 |
| Non-assimilable materials | 9.4 |
| Mineral salts | 5.41 |
| Water | 16.2 |

EXAMPLE 8

A homogeneous paste formed by a mixture of the following materials is prepared. The composition of the mixture in weight percent is as follows:

| | (%) |
|---|---|
| Fructose (in the form of a syrup containing 70% by weight of dry materials) | 40.8 |
| D-sorbitol | 5.0 |
| Apple marc powder* | 22.5 |
| Protein material capable of foaming in the presence of water** | 2.5 |
| Dietary gelatin*** | 1.7 |
| Sodium chloride | 0.2 |
| Rice grains expanded by sudden heating | 8.0 |
| Currants**** | 6.3 |
| Water | 13 |

\* = Apple marc subjected to water-vapour extraction for one hour, then rinsed with cold water and dried at 60°C. in a drying oven with air circulation and finally reduced to powder of a medium grain size of 75 microns.

\*\* = A mixture having the following composition in weight percent:

| | (%) |
|---|---|
| Assimilable proteins | 80 |

-Continued

|  | (%) |
| --- | --- |
| Ashes (essentially NaCl) | 5 |
| Water | 5 |
| Saccharose | 10 |

*** = Gelatin having a Bloom degree of 130.
**** = Currants having the following composition in weight percent:

|  | (%) |
| --- | --- |
| Assimilable proteins | 2.8 |
| Assimilable carbohydrates | 77.3 |
| Fats | 1.3 |
| Acids | 1.1 |
| Water | 21.2 |

This paste is rolled into a sheet having a thickness of 1.5 cm. The sheet is cut into strips of a width of 2.5 cm and the strips are cut into sticks of a length of 8 cm. The sticks are immersed into a chocolate coating bath (bitter black chocolate) having the following composition in weight percent:

|  | (%) |
| --- | --- |
| Fats | 38.5 |
| Carbohydrates | 46.4 |
| Water | 1.0 |
| Proteins (N × 6.25) | 9.2 |

The caloric content of the chocolate coating bath is 583 calories per 100 g. The chocolate coating bath is previously subjected to the following cycle of thermal treatments designed to impart to it an appropriate viscosity. These treatments consist in melting at 40° C., cooling within one-half hour to 32° C. and stirring for one-half hour at this temperature, cooling within one-half hour to 28° C., and re-heating within one-half hour to 30°–32° C. Immediately after immersion of the sticks, the confectionery articles thus produced are placed in a room at a temperature of 10°–12° C.

In this manner, chocolate coated sticks are produced in which the weight of the chocolate coating amounts to about 10 % of the weight of the paste. The caloric content of the paste is 245 calories per 100 g and it has the following overall composition in weight percent:

|  | (%) |
| --- | --- |
| Assimilable proteins | 4.2 |
| Assimilable hydrocarbons | 52.1 |
| Fats | traces |
| Non-assimilable materials | 22.5 |
| Mineral salts | 0.3 |
| Water | 13.0 |

EXAMPLE 9

The process as described in Example 8 is repeated but with a paste having the following composition in weight percent:

|  | (%) |
| --- | --- |
| Fructose (in the form of a syrup containing 70% by weight of dry materials) | 40.8 |
| Ground degreased and roasted soya-semolina | 2.0 |
| Dietary gelatin | 2.5 |
| Apple marc powder* | 28.0 |
| Protein material capable of foaming in the presence of water | 6.0 |
| Sodium chloride | 0.2 |
| Rice grains expanded by sudden heating | 8.2 |

-Continued

|  | (%) |
| --- | --- |
| Water | 12.0 |

* = Apple marc which has been depectinized by extraction in an aqueous acid medium followed by extraction in an aqueous alkaline medium (residue of industrial pectin production), then subjected to a treatment in boiling water for one hour, then rinsed with cold water and dried at 60°C. in a drying oven with air circulation, and finally reduced to powder of a medium grain size of 75 microns.

The paste of the confectionery article thus produced has the following overall composition in weight percent:

|  | (%) |
| --- | --- |
| Assimilable proteins | 8.8 |
| Assimilable carbohydrates | 51.6 |
| Fats | traces |
| Non-assimilable materials | 28.0 |
| Mineral salts | 0.6 |
| Water | 12.0 |

The caloric content of the paste is 228.7 calories per 100 g.

EXAMPLE 10

The process as described in Example 8 is repeated but with a paste having the following composition in weight percent:

|  | (%) |
| --- | --- |
| Fructose (in the form of a syrup containing 70% by weight of dry materials) | 42.5 |
| Degreased and roasted soya-semolina | 8.0 |
| Dietary gelatin | 2.5 |
| Apple marc powder* | 22.5 |
| Protein material capable of foaming in the presence of water | 6.0 |
| Sodium chloride | 0.1 |
| Rice grains expanded by sudden heating | 9.9 |
| Water | 12.0 |

* = Raw apple marc which has been dried at 60°C. in a drying oven with air circulation and reduced to powder of a medium grain size of 75 microns. The apple marc thus dried has the following composition in weight percent:

|  | (%) |
| --- | --- |
| Humidity | 6.67 |
| Directly reducing sugars | 16.7 |
| Sugars, reducing after inversion | 5.7 |
| Nitrogen | 0.91 |
| Nitrogenous materials (N × 6.25) | 5.96 |
| Minerals | 1.33 |
| Non-assimilable carbohydrates (cellulose, acids, sorbite, pectin, etc.) | 63.91 |

The paste of the confectionery article thus produced has the following composition in weight percent:

|  | (%) |
| --- | --- |
| Assimilable proteins | 8.9 |
| Non-assimilable carbohydrates | 58.1 |
| Fats | traces |
| Non-assimilable materials | 16.0 |
| Mineral salts | 0.7 |
| Water | 12.0 |

The caloric content of the paste is 274.2 calories per 100 g.

By way of comparison, conventional confectioneries of the same type as the foodstuff produced according to the process of the present invention have been analyzed to determine their content in carbohydrates, proteins and fats. The caloric content of these confectioneries has been calculated on the basis of the results obtained from their analysis.

The analyzed conventional confectioneries have the following characteristics:

| Confectionery article A | Crisp chocolate coated stick of light hazelnut paste. |
| --- | --- |
| Confectionery article B | Chocolate coated grape sugar caramel stick. |
| Confectionery article C | Light crisp chocolate stick. |
| Confectionery article D | Chocolate coated hazelnut stick. |
| Confectionery article E | Milk chocolate stick stuffed with caramel and candy cream. |

As will be seen by comparing the properties of the conventional confectionery articles contained in the following Table with the corresponding properties of the foodstuff of the present invention as described in the preceding Examples, all the conventional confectionery articles have a percentage by weight of carbohydrates and fats which is much higher than that of the foodstuff of the present invention. Further, they contain less assimilable proteins and their caloric content is about twice as high as that of the foodstuff of the present invention.

|  | Conventional confectionery articles | | | | | Foodstuff of the present invention (No. of Example) | | | | | | | | | |
| --- | --- | --- | --- | --- | --- | --- | --- | --- | --- | --- | --- | --- | --- | --- | --- |
|  | A | B | C | D | E | 1 | 2 | 3 | 4 | 5 | 6 | 7 | 8 | 9 | 10 |
| Caloric power (calories/100g) | 587 | 490 | 573 | 502 | 490 | 260 | 276.7 | 318.9 | 322.5 | 298.2 | 281.6 | 269 | 245 | 228.7 | 274.2 |
| Content of assimilable proteins (% by wt.) | 5.88 | 4.13 | 6.19 | 5.88 | 4.78 | 14.40 | 7.3 | 13.33 | 17.85 | 18 | 20.24 | 19.3 | 4.2 | 8.8 | 8.9 |
| Content of assimilable carbohydrates (% by wt.) | 59.5 | 73.4 | 58.75 | 69.2 | 70.0 | 39.51 | 51.8 | 58.06 | 54.97 | 51.4 | 43.20 | 43.8 | 52.1 | 51.6 | 58.1 |
| Fat content (% by wt.) | 33.8 | 18.1 | 32.13 | 20.1 | 19.14 | 3.35 | 2.3 | 2.80 | 2.66 | 1.65 | 1.40 | 0.87 | traces | traces | traces |

Although some examples for putting the invention into practice have been described herein, it is to be understood that the invention is not limited to these precise Examples and that various changes and modifications may be made therein without departing from the scope of the invention.

We claim:

1. A process for the production of a foodstuff, comprising the steps of:
   (1) mixing:
   a. at least one assimilable protein material soluble or dispersible in an aqueous medium having a pH between 6.2 and 7.2,
   b. at least one assimilable carbohydrate, selected from the group containing monosaccharides and oligosaccharides, and
   c. water, the proportions of these ingredients corresponding, respectively, to from 1 to 45%; from 35 to 60%, and from 4 to 25% of the total weight of the foodstuff, wherein a portion of said assimilable protein material corresponding to at least 1% of the total weight of the foodstuff is in a form capable of foaming in the presence of water;

2. stirring, during or after the mixing operation, the solution or dispersion thus obtained so as to form a foam;
3. mixing at least one gelling agent, selected from the group consisting of gelling proteins and gelling carbohydrates, containing at least 70% by weight of non-assimilable material, with said foam, the amount of said gelling agent being up to 20% of the total weight of the foodstuff; and
4. mixing at least one powdery vegetable cellulose material with the latter mixture, so as to form a homogeneous paste, the proportion of said powdery cellulose material being such that the total amount of gelling agent and cellulose material is from 12 to 40% of the total weight of the foodstuff.

2. A process as claimed in claim 1, wherein the ingredients of the mixture during the preparation of the paste are kept at a temperature in the range between 10° and 130° C.

3. A process as claimed in claim 1, wherein the mixture is heated to a temperature between 85° and 100° C, for at least 10 minutes and then allowed to cool down to ambient temperature.

4. A process as claimed in claim 1, wherein fats in an amount of not more than 5% by weight of the total weight of the mixture are added to the latter.

5. A process as claimed in claim 1, wherein a flavour is added to the mixture.

6. A process as claimed in claim 1, wherein at least one additive for improving the properties of conservation of the foodstuff is added to the mixture.

7. A process as claimed in claim 1, wherein at least one additive for improving the capacity of the foodstuff to retain moisture is added to the mixture.

8. A process as claimed in claim 1, wherein at least one mineral salt is added to the mixture.

9. A process as claimed in claim 8, wherein said mineral salt is sodium chloride.

* * * * *